United States Patent
Jimenez Martinez et al.

(10) Patent No.: US 9,898,015 B2
(45) Date of Patent: Feb. 20, 2018

(54) SYSTEM FOR REGULATING PRESSURE IN A FLUID SUPPLY PIPE

(71) Applicant: AQUATEC, PROYECTOS PARA EL SECTOR DEL AGUA, S.A.U., Madrid (ES)

(72) Inventors: Alberto Jimenez Martinez, Murcia (ES); Javier Pardo Masso, La Alberca (ES); Felix Mendaza Martinez, Murcia (ES); Jonathan Sanchez Rodriguez, Chauchina (ES)

(73) Assignee: AQUATEC, PROYECTOS PARA EL SECTOR DEL AGUA, S.A.U., Madrid (ES)

( * ) Notice: Subject to any disclaimer, the term of this patent is extended or adjusted under 35 U.S.C. 154(b) by 130 days.

(21) Appl. No.: 14/441,935

(22) PCT Filed: Nov. 25, 2013

(86) PCT No.: PCT/ES2013/070813
§ 371 (c)(1),
(2) Date: May 11, 2015

(87) PCT Pub. No.: WO2014/083225
PCT Pub. Date: Jun. 5, 2014

(65) Prior Publication Data
US 2015/0286223 A1    Oct. 8, 2015

(30) Foreign Application Priority Data

Nov. 29, 2012 (ES) .................................. 201231854

(51) Int. Cl.
*F16K 31/12* (2006.01)
*G05D 16/10* (2006.01)
*G05D 16/20* (2006.01)

(52) U.S. Cl.
CPC ......... *G05D 16/10* (2013.01); *G05D 16/2093* (2013.01); *Y10T 137/7762* (2015.04); *Y10T 137/7793* (2015.04)

(58) Field of Classification Search
CPC ................................................. Y10T 137/7762
(Continued)

(56) References Cited

U.S. PATENT DOCUMENTS 2,320,886 A    5/1941  Quiroz
2,266,871 A *  12/1941 Krogh ...................... G05B 6/05
                                                         236/82
(Continued)

FOREIGN PATENT DOCUMENTS

ES    2 349 205 A1    12/2010

OTHER PUBLICATIONS

International Search Report of PCT/ES2013/070813, dated Feb. 24, 2014. [PCT/ISA/210].
(Continued)

*Primary Examiner* — R. K. Arundale
(74) *Attorney, Agent, or Firm* — Sughrue Mion, PLLC

(57) ABSTRACT

A system for regulating pressure in a fluid supply pipe, including a valve operated by a double acting piston cylinder and in which the chamber of the cylinder, the pressure of which acts on the piston to move the rod in the direction for closing the valve, communicates with the transmission mechanism for transmitting the instantaneous hydraulic pressure at a point of the pipe. The chamber of the cylinder, the pressure of which acts on the piston to move the rod in the direction for opening the valve, is connected to an energy accumulator accumulating energy in the form of pressurized gas at a predetermined pressure P0, which can be regulated.

9 Claims, 2 Drawing Sheets

(58) Field of Classification Search
USPC .................................................. 91/4 A, 4 R
See application file for complete search history.

(56) References Cited

U.S. PATENT DOCUMENTS

| | | | | |
|---|---|---|---|---|
| 2,470,681 A * | 5/1949 | Martin | ................ | E21B 43/122 |
| | | | | 137/155 |
| 3,223,114 A * | 12/1965 | Shafer | ................ | F16K 31/122 |
| | | | | 137/494 |
| 3,734,120 A | 5/1973 | Rowe et al. | | |
| 3,769,998 A * | 11/1973 | Avant | ................ | F16K 31/365 |
| | | | | 137/116.5 |
| 3,997,282 A | 12/1976 | Thomas et al. | | |
| 4,141,533 A | 2/1979 | Goodman | | |
| 4,223,531 A * | 9/1980 | Fukunaga | ........... | F15B 11/0725 |
| | | | | 60/400 |
| 4,226,124 A | 10/1980 | Kersten | | |
| 4,617,958 A * | 10/1986 | Seidel | ................ | G05D 16/163 |
| | | | | 137/488 |
| 4,729,224 A * | 3/1988 | McAteer | ................ | F15B 21/06 |
| | | | | 60/593 |
| 5,797,583 A * | 8/1998 | Murata | ................ | F16K 31/124 |
| | | | | 251/57 |
| 6,095,184 A * | 8/2000 | Neff | ................ | G05D 16/16 |
| | | | | 137/115.21 |
| 6,416,033 B1 * | 7/2002 | McKell | ................ | F15B 9/09 |
| | | | | 251/29 |
| 9,341,280 B2 * | 5/2016 | Pirat | ................ | F16K 31/1245 |
| 9,482,346 B2 * | 11/2016 | Hughes | ................ | F04C 29/124 |
| 2007/0095401 A1 * | 5/2007 | Webster | ................ | F16K 17/10 |
| | | | | 137/488 |
| 2008/0000531 A1 | 1/2008 | Robb et al. | | |
| 2010/0301238 A1 * | 12/2010 | Krake | ................ | F16K 31/1245 |
| | | | | 251/25 |
| 2014/0366965 A1 * | 12/2014 | Simpson | ................ | B64D 13/04 |
| | | | | 137/500 |

OTHER PUBLICATIONS

Spanish Search Report of Spanish Patent Application No. 201231854, dated Nov. 29, 2012.

* cited by examiner

SYSTEM FOR REGULATING PRESSURE IN A FLUID SUPPLY PIPE

CROSS REFERENCE TO RELATED APPLICATIONS

This application is a National Stage of International Application No. PCT/ES2013/070813 filed Nov. 25, 2013, claiming priority based on Spanish Patent Application No. P 201231854, filed Nov. 29, 2012, the contents of all of which are incorporated herein by reference in their entirety.

TECHNICAL FIELD OF THE INVENTION

The invention relates to a system for regulating pressure in a fluid supply pipe that can be applied for automatically regulating the water distribution pressure in a network, for example in a consumer network. The invention also relates to a device particularly suitable for implementing the aforesaid system.

BACKGROUND OF THE INVENTION

Hydraulic valves are sometimes used to regulate pressure in a supply pipe. These valves can be operated manually or by means of actuators that need a source of power, such as electric power.

When these valves are installed in remote sites with respect to the power grid, electric generators have to be taken to the site where the valves are located to power the corresponding actuators and to enable operating said valves.

Some proposals based on hydraulic actuators, which use the energy provided by the pressure of the fluid itself that is carried through the pipe to operate the valve, have been disclosed to solve this drawback. Nevertheless, such proposals are not versatile nor do they offer the possibility of operating the valve other than the complete opening or closing of the valve.

A first objective of the invention is therefore a system whereby the valve can be operated, for example to regulate the pressure of the fluid to a predetermined set point pressure, which can further be selected as needed and in a very simple manner.

Another objective of the invention is a system that offers the possibility of regulating the pressure of the fluid automatically and according to two different set point pressures, for example for regulating the pressure of the fluid to a first daytime set point pressure, i.e., during peak hours; and for regulating the pressure of the fluid to a lower second nighttime set point pressure, during off-peak hours, to reduce losses of the distribution network downstream of the valve.

The system must furthermore be compatible with the valves that are used, i.e., no adjustments need to be made in existing installations.

A secondary objective of the invention is for the system to allow different ways of putting it into practice in which the set point pressure or pressures can be changed and pressure can be modulated remotely, for example from a control center or a local control system by means of an automaton.

DISCLOSURE OF THE INVENTION

The system of the invention comprises a hydraulic valve with mechanical means for actuation thereof and a double acting piston cylinder, with first and second chambers and a rod connected to the mechanical actuation means of said valve, the system further comprising transmission means for transmitting the instantaneous hydraulic pressure in at least one point of the pipe to one of the chambers of the cylinder.

The invention is essentially characterized in that the chamber of the cylinder, the pressure of which acts on the piston to move the rod in the direction for closing the valve, is the chamber that communicates with the transmission means for transmitting the instantaneous hydraulic pressure of the pipe; whereas the chamber of the cylinder, the pressure of which acts on the piston to move the rod in the direction for opening the valve, is connected to an energy accumulator accumulating energy in the form of pressurized gas at a predetermined pressure P0, the system comprising means for regulating said determined pressure P0.

In a preferred embodiment, the energy accumulator accumulating energy in the form of pressurized gas is formed by a first chamber of a hydropneumatic tank containing the gas, a second chamber of said hydropneumatic tank being hydraulically connected to the supply pipe at a point upstream of the valve.

In one embodiment, the hydropneumatic tank is a hydropneumatic membrane tank.

According to a variant of the invention, the transmission means for transmitting the instantaneous hydraulic pressure at a point of the pipe to the chamber of the cylinder comprise a tank connected to the pipe and housing an expandable cavity holding a driving fluid in a leak-tight manner with respect to the inside of said tank, said expandable cavity being connected to the corresponding chamber of the cylinder.

In a variant of interest, the system comprises an electric valve for selectively setting up a hydraulic connection, by means of respective conduits, between said tank and the supply pipe at two different points, one of which is located upstream of the valve and the other is located downstream of said valve.

The connection between the second chamber of the hydropneumatic tank and the point of the pipe arranged upstream of the valve preferably comprises a reducing valve and a three-way valve arranged between said connection point and the reducing valve, said second chamber being connected to the outlet of the reducing valve and the conduit for connecting with the tank being connected to a free port of the three-way valve.

In an embodiment of interest, the system comprises a pressure transducer connected to the outlet of the first chamber and a set of electric valves connected to the inlet of the second chamber of the hydropneumatic tank, controlled by a control system that can be controlled remotely and with means for comparing the value of the gas pressure at the outlet of the first chamber, obtained by means of the pressure transducer, with a set point pressure value P1 in time real, and that can generate a control signal in response to said comparison operation suitable for acting on the set of electric valves.

In a variant of the invention, the gas is nitrogen.

In another embodiment, the energy accumulator accumulating energy in the form of pressurized gas comprises a gas cylinder with a capacity between 12 and 24 liters.

According to another aspect of the invention, a device for regulating pressure in a fluid supply pipe comprising a support body with means for the firm fixing thereof to the body of a valve, such as a butterfly valve, is disclosed; there being attached to the support body a double acting piston cylinder that can rotate about a horizontal axis in a position for mounting the support body on the valve, with first and second chambers connected to the outside and a rod prepared for the articulated connection thereof to a mechanism; and an energy accumulator accumulating energy in the form of pressurized gas, communicated with the first chamber of the cylinder. A tank housing an expandable cavity holding a driving fluid in a leak-tight manner with respect to the inside of said tank, connected to the second chamber of the cylinder, can also be optionally attached to the support body, the tank being equipped with means for hydraulically connecting it to an external feeding point.

In one embodiment, the energy accumulator is a first chamber of a hydropneumatic tank equipped with means for hydraulically connecting its second chamber to an external fluid feeding point.

DETAILED DESCRIPTION OF THE INVENTION

Figure 1:
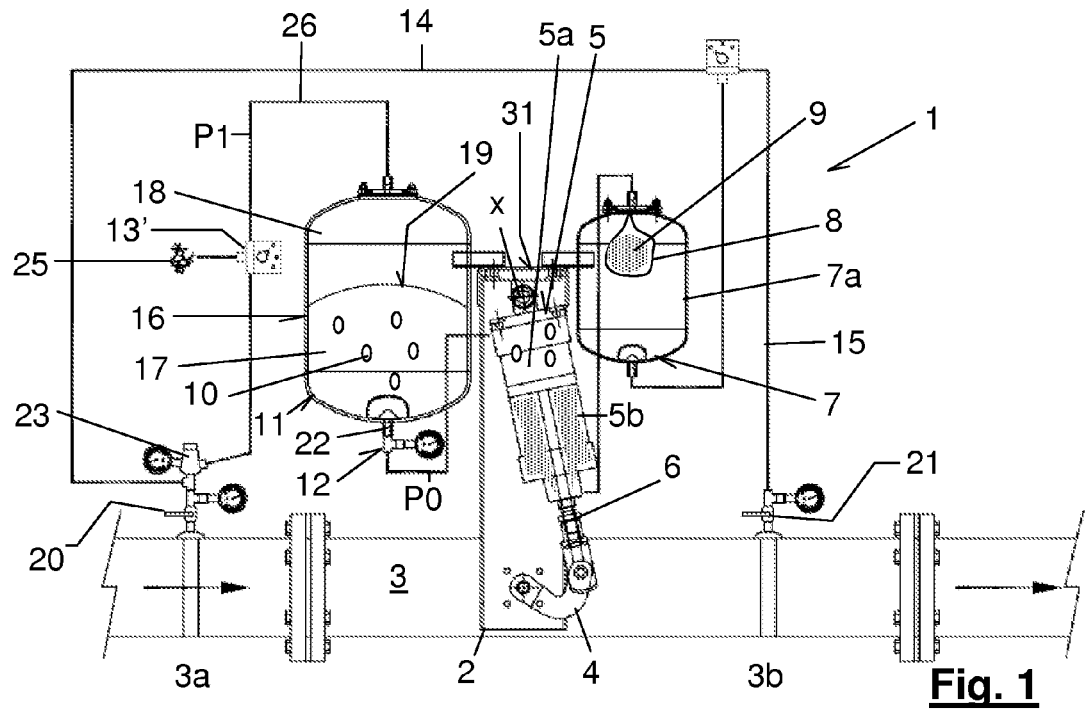
FIG. 1 shows an embodiment of the invention suitable for being able to perform a scheduled regulation of two set point values. This embodiment is suitable for example for obtaining in a water supply pipe a daytime set point pressure P1; and a nighttime set point pressure P0.

The system 1 for regulating pressure illustrated in FIG. 1 is suitable for maintaining an optimal daytime pressure P1 in a supply pipe 3, downstream of the valve 2, and reducing it to a nighttime pressure P0 for reducing the volume of losses.

The valve 2 is a butterfly valve with mechanical means 4 for actuation thereof, formed in the example by a lower lever arm.

This lever arm is connected to the rod 6 of a double acting piston cylinder 5, such that the linear movement of the piston, and therefore of the rod 6, in one direction or the other will cause the rotation of the lever arm in one direction or the other, operating the valve 2 for opening or closing it.

The cylinder 5 of the system 1 of the example basically consists of a barrel-type cylinder and a moveable piston connected to the aforesaid rod 6. The barrel-type cylinder is closed at both ends, one of which is provided with a perforation where the rod 6 projects. The piston splits the inside of the barrel-type cylinder into two chambers 5a and 5b.

As will be explained below, the system of FIGS. 1 to 3 uses a compressed gas 10 as a source of power to move the rod 6 of the cylinder 5 in one direction, whereas it uses a driving fluid 9, such as an oil, to move the rod 6 in the opposite direction.

This cylinder 5 can be mounted in an articulated manner to the body of the valve 2, which can in turn support other important components of the system.

In the example of FIG. 1, the chamber 5b of the cylinder 5, the pressure of which acts on the rod 6 to move it in the direction for closing the valve 2, communicates with an expandable cavity 8 containing the driving fluid 9. This expandable cavity 8 is housed in a rigid tank 7a connected to the pipe 3 and therefore full of water at a pressure the value of which will be established by the pressure of the water circulating at that time through the section of the pipe 3 to which the tank 7a is connected.

The expandable cavity 8 is formed by an elastic bladder inside the tank 7a, which is leak-tight with respect to the content of this tank 7a.

In the depicted embodiment, the system 1 comprises a first electric valve 13 for selectively setting up a hydraulic connection, by means of respective conduits 14 and 15, between said tank 7a and the supply pipe 3 at two different points 3a, 3b. Point 3a is located upstream of the valve 2 and point 3b is located downstream of said valve 2. These conduits 14 and 15 can be formed, for example, by 0.25 inch, i.e., 0.6 cm, polyamide tubes.

On the other hand, the chamber 5a of the cylinder 5, the pressure of which acts on the piston to move the rod in the direction for opening the valve 2, communicates with a first chamber 17 of a hydropneumatic tank 16 containing the gas 10 used as a source of power to move said rod 6.

The hydropneumatic tank 16 is a tank in which said first chamber 17, containing the gas 10 at a pressure P0, is separated from the second chamber 18 by means of an elastic membrane 19. This second chamber 18 is connected to the pipe 3 at a point 3a upstream of the valve 2. As a result, the gas 10 flowing between the first chamber 17 of the hydropneumatic tank 16 and the chamber 5a of the cylinder 5 acting as means for transmitting the pressure exerted on the gas 10 by the pressure of the water upstream of the valve 2.

By way of example, the membrane 19 can be a replaceable, one-piece membrane made of flexible synthetic rubber. This material provides the membrane 19 with impermeability features that assure permanent isolation of the gas 10 from water, thereby excluding any possibility of corrosion of the internal metal surface of the hydropneumatic tank and any possibility of dilution of the gas in the water.

The invention also contemplates the use of a bladder-type membrane for the hydropneumatic tank 16.

The instantaneous position of the rod 6 of the cylinder 5 will be determined by the pressure exerted on the piston of the cylinder 5 by the driving fluid 9 on one hand and the gas 10 on the other hand. It must be observed that while the force exerted on the piston by the driving fluid 9 will be directly proportional to the pressure of the water flowing through the pipe 3 at all times, downstream or upstream of the valve 2 according to the position of the electric valve 13, the force exerted by the gas 10 on the piston could be determined by the pressure P0 of the gas when the pressure P1 of the second chamber 18 of the hydropneumatic tank 16 is less than P0. In practice, the first chamber 17 of the hydropneumatic tank 16 performs the function of energy accumulator 11 accumulating energy in the form of pressurized gas 10.

In these embodiments oil is used as a driving fluid 9. Although it is envisaged that the hydraulic pressure of the pipe 3 is transmitted directly to the chamber 5b of the cylinder 5 by means of a conduit communicating said pipe 3 with the cylinder 5, the use of the tank 7a as transmission means 7 for transmitting the instantaneous hydraulic pressure of the pipe to the cylinder 5 prevents water from penetrating said cylinder 5, protecting it against corrosion and/or oxidation, in addition to reducing the effects produced such as blows from rams or the like and favors a more regular transmission of pressure to the cylinder.

The operation of the system 1 according to this first embodiment is as follows:

With the objective of supplying water at a daytime set point pressure P1 (such as a pressure of 3 atm, for example) and at a nighttime set point pressure P0 (such as a pressure of 1.5 atm, for example), the second chamber 18 of the hydropneumatic tank 16 is connected to the water supply pipe 3 at a point 3a located upstream of the valve 2. This connection is made by means of the conduit 26 and the use of a three-way valve 20 and a water pressure reducing valve 23 that allows precisely selecting the daytime set point pressure P1, which will be the inlet pressure at said second chamber 18.

On the other hand, the first chamber 17 of the hydropneumatic tank 16 is full of a gas 10, such as nitrogen gas, for example, at a nighttime set point pressure P0. It must be taken into consideration that this first chamber 17 of the hydropneumatic tank 16 is connected with the chamber 5a of the cylinder 5.

For the pressure downstream of the valve 2 to be automatically regulated to the daytime set point pressure P1, the tank 7 is connected to the pipe 3 at a point 3b arranged downstream of the valve 2, through the conduit 15 and the use of the three-way valve 21.

By means of a timer, during the daytime said timer will activate the three-way valve 13' to allow water into the hydropneumatic tank 16 with pressure P1 gauged in the reducing valve 23 (this set point pressure P1 could evidently be equal to or less than the network pressure, i.e., the pressure of the water upstream of the valve 2).

The piston of the cylinder 5 will be subjected to a thrust due to the difference in pressure on both sides of said piston until the pressures on both sides of the piston match.

In more detail, starting from a situation in which the pressure of the fluid downstream of the valve 2 was the nighttime set point pressure P0, the highest pressure P1 in the second chamber 18 of the hydropneumatic tank 16 will be transmitted to the piston by means of the gas 10, causing the rod 6 to move in the direction for opening the valve 2 until the pressure downstream of the valve 2, transmitted to the piston of the cylinder 5 by the hydraulic circuit formed by the conduit 15 and the tank 7, which moves the driving fluid 9 acting directly on said piston, matches pressure P1.

To return to the nighttime set point supply pressure P0, the timer will act on the three-way valve 13' to close the water inlet into the second chamber 18 of the hydropneumatic tank 16, and pressure in the second chamber 18 of the hydropneumatic tank will preferably be relieved by means of a bleeding device 25 connected to one of the outlets of said electric valve 13'. Under these circumstances, the minimum set point regulating value will be determined by the pressure P0 of the gas 10 contained in the first chamber 17 of the hydropneumatic tank 16 in communication with the cylinder 5. This pressure P0 will instantaneously be less than the previous pressure P1 of the water downstream of the valve 2, which will provoke an operation to close the valve until the pressure downstream of said valve matches the nighttime set point pressure P0.

As observed in FIG. 1, the first chamber 17 of the hydropneumatic tank 16 is provided with means 12 for regulating the set point pressure P0, formed for example by a filling and bleed valve 22, which allows introducing and extracting gas 10, respectively, for selecting the desired nighttime set point pressure P0.

The system of FIG. 1 is likewise suitable for performing a regulated operation for closing the valve 2 other than that described above to go from a set point pressure P1 to a lower set point pressure P0 determined by the gas 10.

For that effect it is only necessary to use the electric valve 13 to enable communication between the tank 7 and the pipe 3 upstream of the valve 2 through the conduit 14, closing the connection between the tank 7 and point 3b of the pipe 3 arranged downstream of the valve 2. It must be taken into account that this connection between the tank 7 and the pipe 3 at point 3a is made without pressure being affected by the reducing valve 23.

Starting from an initial situation in which the pressure of the water in the pipe 3 downstream of the valve 2 is greater than the set point pressure P1, the force caused by the movement of the rod 6 in the direction for closing the valve, specifically the force exerted by the driving fluid 9 on said piston determined by the instantaneous pressure of the water in the pipe 3 upstream of the valve 2, greater than P1, will overcome the piston of the cylinder 5. The operation for closing the valve will automatically stop when pressures on both sides of the piston of the cylinder 5 match, in practice when pressure on both sides is the set point pressure P1.

The electric valves 13 and 13' can be linked to one or more respective timers so that these operations can be performed automatically at the established times.

Figure 2:
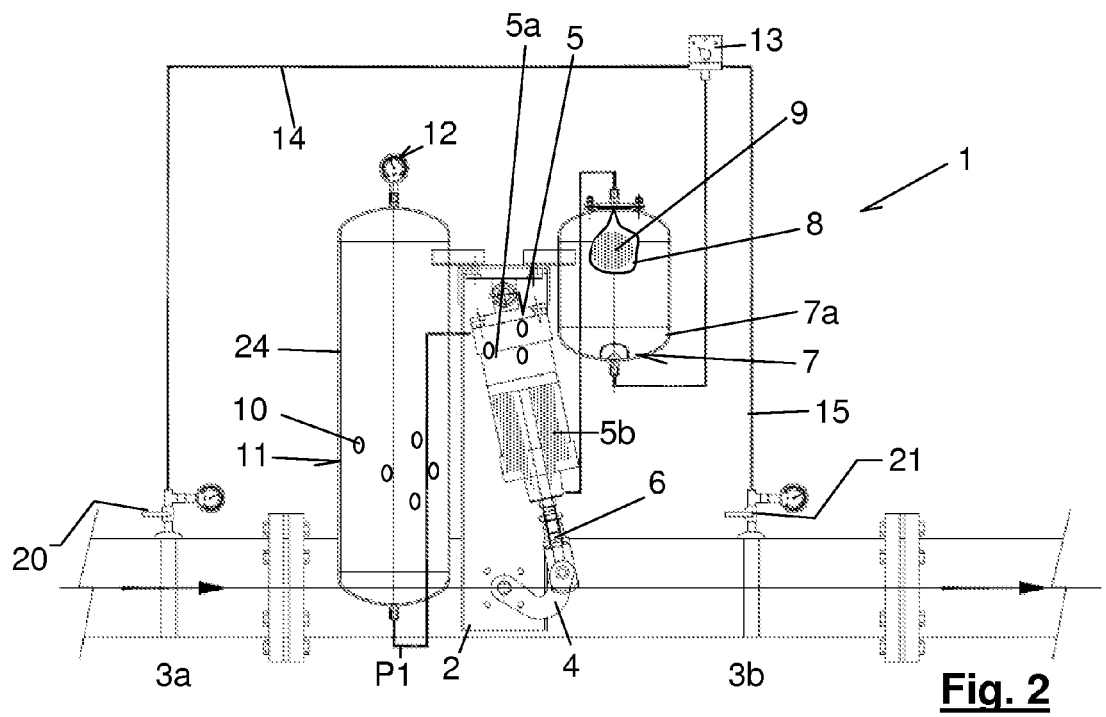
FIG. 2 shows an embodiment of the invention suitable for being able to perform a scheduled regulation of a set point value. This embodiment is suitable for example for maintaining a single set point pressure P0 in a water supply pipe.

FIG. 2 shows a simpler embodiment of the system 1 according to the invention, suitable for maintaining a predetermined single set point pressure P0 in a network, downstream of the valve 2. This regulation can be permanent or limited to a time interval.

In this case, the energy accumulator 11 accumulating energy in the form of pressurized gas 10 is formed by a gas cylinder 24, provided with a filling and bleed valve 22 for introducing gas 10 at a single set point pressure P0 and for extracting gas, respectively, if this set point pressure P0 is to be reduced. The capacity of the cylinder is preferably selected from between 12 and 24 liters. It must be taken into consideration that the minimum volume will be sized for a large enough volume to avoid differences in pressure caused by changes in volume of the chambers 5a and 5b of the cylinder 5.

According to this embodiment, the chamber 5a of the cylinder 5 will be connected to the gas cylinder 24, containing nitrogen gas, for example, at a set point pressure P0, this chamber 5a of the cylinder 5 being the chamber the pressure of which acts on the piston to move the rod 6 in the direction for opening the valve 2, as in the preceding embodiment.

In turn, the chamber 5b of the cylinder 5, the pressure of which acts on the piston of the cylinder 5 to move the rod 6 in the direction for closing the valve 2, communicates with an expandable cavity 8 containing the driving fluid 9 and housed in a tank 7 in turn connected to the pipe 3 in a manner similar to the example of FIG. 1. In this sense, the system 1 is provided with an electric valve 13 for selectively setting up a hydraulic connection, by means of respective conduits 14 and 15, between said tank 7 and the supply pipe 3 at two different points 3a, 3b, point 3a being located upstream of the valve 2 and point 3b being located downstream of said valve 2.

When an opening operation regulated to the set point pressure P0 starting from a supply pressure less than P0 downstream of the valve 2 is to be performed, connection of the tank 7 with point 3b of the pipe 3 will be enabled through the conduit 15.

When a closing operation regulated to the set point pressure P0 downstream of the valve 2 having a network pressure greater than P0 is to be performed, or the pressure in the pipe 3 downstream of the valve 2 is to be sustained, connection of the tank 7 with point 3a of the pipe 3 will be enabled through the conduit 14.

The invention contemplates simpler implementations of the system 1. In this sense, embodiments similar to those of FIG. 2, for example, in which the electric valve 13 is removed from the system, are envisaged. This would give rise to two different embodiments: one in which the tank 7 is connected by means of a single conduit 14 to the pipe 3 at a point 3a upstream of the valve 2, intended for performing operations for closing the valve 2 for regulating the pressure to a set point pressure P0; and another in which the tank 7 is connected by means of a single conduit 15 to the pipe 3 at a point 3b downstream of the valve 2, intended for performing operations for opening the valve 2 for regulating the pressure to the set point pressure P0.

Figure 3:
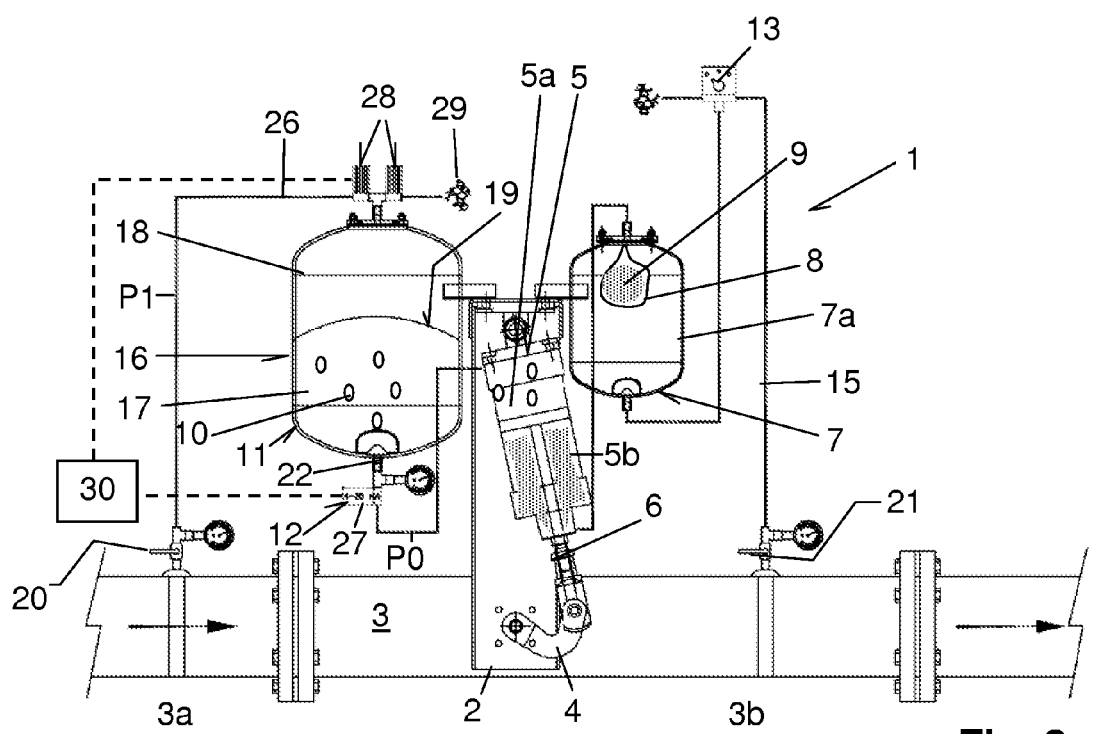
FIG. 3 shows an embodiment for being able to perform a remotely controlled regulation of two set point values, one of which is a variable set point pressure P1, and the other is a fixed set point pressure P0.

The variant of FIG. 3 offers the possibility of locally or remotely controlling the system 1 according to the invention to establish the desired pressure variation.

Starting from an embodiment similar to that of FIG. 1, the system 1 of FIG. 3 incorporates a pressure transducer 27 at the outlet of the hydropneumatic tank 16. This pressure transducer 27 transforms a differential pressure into a normalized electric signal that allows connecting the pressure transducer 27 to a pressure control system 30 that also controls at least the set of electric valves 28 connected to the inlet of the second chamber 18 of the hydropneumatic tank 16.

This control system 30 is provided with means for remotely connecting to a network operator, which selects a determined set point pressure P1. Starting from this target pressure value P1, the control system 30 will control the set of electric valves 28 and will compare the instantaneous pressure value at the outlet of the first chamber 17 of the hydropneumatic tank 16, obtained by means of the pressure transducer 27, with the target value P1 in time real until they match.

When the pressure of the conduit 3 has to be regulated to the set point pressure P0, the same control system will act on the set of valves 28 to close the water inlet into hydropneumatic tank 16 and bleed off or release pressure into the second chamber 18 of the hydropneumatic tank by means of the bleeding device 25.

In a known manner, the system 1 of the invention incorporates means for reading the pressure in different parts of the system, such as pressure manometers, for example, in the connections with the pipes 3 at points 3a and 3b, in the hydrostatic tank 16, or, where appropriate, in the gas cylinder 24, and in the tank 7.

Finally, it has also been envisaged to incorporate in the system 1 means for generating electric power from the flow of the current circulating through the pipe 3. By way of example, the system 1 can incorporate a hydraulic turbine installed inside the pipe 3, the generated electric power of which would power the electric valves 13, 13' and, where appropriate, the control system 30.

To maximally standardize the tasks necessary for installing the system according to the invention in a current installation, the invention contemplates providing a support body with means for the firm fixing thereof to the body of a valve 2, such as a butterfly valve; there being attached to the support body 31 at least one double acting piston cylinder 5 that can rotate about a horizontal axis (x) in a position for mounting said support body 31 on the valve, with first and second chambers 5a, 5b connected to the outside and a rod 6 prepared for the articulated connection thereof to a mechanism; and an energy accumulator 11 accumulating energy in the form of pressurized gas 10, communicated with the first chamber 5a of the cylinder 5.

The invention claimed is:

1. A system for regulating pressure in a fluid supply pipe, comprising a hydraulic valve with mechanical means for actuation thereof and a double acting piston cylinder, with a first chamber and a second chamber and a rod connected to the mechanical actuation means of said hydraulic valve, the system further comprising transmission means for transmitting the instantaneous hydraulic pressure in at least one point of the pipe to one of the first chamber or the second chamber of the piston cylinder, wherein
   the second chamber of the piston cylinder, in which the pressure acts on a piston to move the rod in the direction for closing the hydraulic valve, communicates with the transmission means for transmitting the instantaneous hydraulic pressure of the pipe; and
   the first chamber of the piston cylinder, in which the pressure acts on the piston to move the rod in the direction for opening the hydraulic valve, is connected to an energy accumulator accumulating energy in the form of pressurized gas at a predetermined pressure P0;
   the system comprising means for regulating said determined pressure P0; and
   wherein the transmission means for transmitting the instantaneous hydraulic pressure at a point of the pipe to the chamber of the cylinder comprises a tank connected to the pipe and housing an expandable cavity holding a driving fluid in a leak-tight manner with respect to the inside of said tank, said expandable cavity being connected to the chamber of the cylinder.

2. The system according to claim 1, wherein the energy accumulator accumulating energy in the form of pressurized gas is formed by a first chamber of a hydropneumatic tank containing the gas, and a second chamber of said hydropneumatic tank being hydraulically connected to the supply pipe at a point upstream of the hydraulic valve.

3. The system according to claim 1, wherein the hydropneumatic tank is a hydropneumatic membrane tank.

4. The system according to claim 1, comprising an electric valve for selectively setting up a hydraulic connection, by means of respective conduits, between said tank and the supply pipe at a first point and a second point, one of which is located upstream of the hydraulic valve and the other is located downstream of said hydraulic valve.

5. The system according to claim 2, wherein the connection between the second chamber of the hydropneumatic tank and the point of the pipe arranged upstream of the hydraulic valve comprises a reducing valve and a three-way valve arranged between said connection point and the reducing valve, said second chamber being connected to an outlet of the reducing valve and a conduit for connecting with the tank being connected to a free port of the three-way valve.

6. The system according to claim 2, comprising a pressure transducer connected to an outlet of the first chamber and a set of electric valves connected to an inlet of the second chamber of the hydropneumatic tank, controlled by a control system that is configured to be controlled remotely and with means for comparing the value of the gas pressure at the outlet of the first chamber, obtained by the pressure transducer, with a set point pressure value P1 in real time, and that can generate a control signal in response to said comparison operation configured for acting on the set of electric valves.

7. The system according to claim 1, wherein the gas is nitrogen.

8. The system according to claim 1, wherein the energy accumulator accumulating energy in the form of pressurized gas comprises a gas cylinder with a capacity between 12 and 24 liters.

9. A system for regulating pressure in a fluid supply pipe, comprising a hydraulic valve with mechanical means for actuation thereof and a double acting piston cylinder, with a first chamber and a second chamber and a rod connected to the mechanical actuation means of said hydraulic valve, the system further comprising transmission means for transmitting the instantaneous hydraulic pressure in at least one point of the pipe to one of the first chamber or the second chamber of the piston cylinder, wherein
- the second chamber of the piston cylinder, in which the pressure acts on a piston to move the rod in the direction for closing the hydraulic valve, communicates with the transmission means for transmitting the instantaneous hydraulic pressure of the pipe; and
- the first chamber of the piston cylinder, in which the pressure acts on the piston to move the rod in the direction for opening the hydraulic valve, is connected to an energy accumulator accumulating energy in the form of pressurized gas at a predetermined pressure P0;

the system comprising means for regulating said determined pressure P0;

wherein the energy accumulator accumulating energy in the form of pressurized gas is formed by a first chamber of a hydropneumatic tank containing the gas, and a second chamber of said hydropneumatic tank being hydraulically connected to the supply pipe at a point upstream of the hydraulic valve; and wherein the connection between the second chamber of the hydropneumatic tank and the point of the pipe arranged upstream of the hydraulic valve comprises a reducing valve and a three-way valve arranged between said connection point and the reducing valve, said second chamber being connected to an outlet of the reducing valve and a conduit for connecting with the tank being connected to a free port of the three-way valve.

\* \* \* \* \*